No. 889,229. PATENTED JUNE 2, 1908.
E. HIGGINS.
GAS PURIFYING APPARATUS.
APPLICATION FILED DEC. 20, 1905.

Witnesses
Inventor
Eugene Higgins
By James Whitmore
atty.

UNITED STATES PATENT OFFICE.

EUGENE HIGGINS, OF LANSING, MICHIGAN, ASSIGNOR TO AMERICAN SUCTION GAS PRODUCER COMPANY, OF LANSING, MICHIGAN, A CORPORATION OF MICHIGAN.

GAS-PURIFYING APPARATUS.

No. 889,229.     Specification of Letters Patent.     Patented June 2, 1908.

Application filed December 20, 1905. Serial No. 292,571.

*To all whom it may concern:*

Be it known that I, EUGENE HIGGINS, a citizen of the United States of America, residing at Lansing, in the county of Ingham, and State of Michigan, have invented certain new and useful Improvements in Gas-Purifying Apparatus, of which the following is a specification, reference being had therein to the accompanying drawings.

The invention relates to a gas purifying apparatus more particularly designed for use in connection with suction gas producers and the invention consists in the novel construction by which the apparatus is simplified and valuable space is economized as hereinafter set forth.

Figure 1:
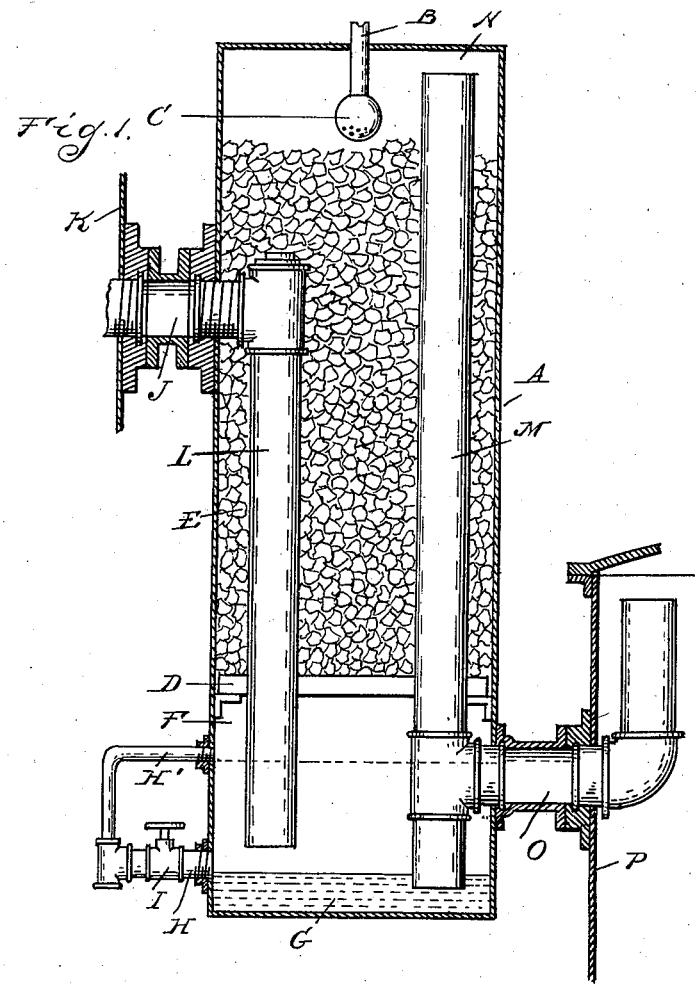
Figure 2:
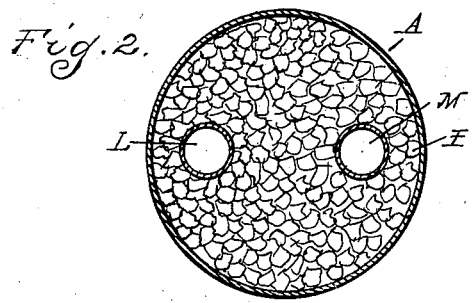

In the drawings, Figure 1 is a vertical central section through the apparatus; and Fig. 2 is a horizontal section thereof.

In the present state of the art of gas purification, the gas generated in the producer is usually passed first to a "scrubber" (which contains coke or other porous material moistened with water through which the gas is filtered) and then to the "cleaner" in which the gas filters through a dry material. The impure gas, as it leaves the producer, contains a certain amount of tarry matter which, as the temperature is lowered, condenses and to avoid clogging of the conduits, it is usual to provide tar traps therein into which this material drains and from which it may be removed from time to time.

In the construction of suction gas producer plants especially designed for use in connection with gas engines, the gas is usually drawn off from the upper end of the producer and is then passed through a conduit which extends downward and connects with the lower end of the scrubber, a tar well being provided at the lower end of this conduit. On the other hand, the outlet conduit for the gas from the scrubber is usually connected to the upper end of the scrubber casing and passes downward to connect with the lower end of the cleaner, a tar well being provided in this connection also. Thus, valuable floor space is occupied by these necessary connections between the different parts of the apparatus.

It is the object of the present invention to simplify the construction, first, by dispensing with the separate tar traps connected with the gas conduits and, further, to economize space as well as to simplify the construction by forming the external connections between the scrubber and the adjacent apparatus, *i. e.* the producer and cleaner, of straight laterally extending conduits. These changes are produced without any detriment to the apparatus by arranging within the scrubber casing vertical extensions of the inlet and outlet conduits, which are open at their lower ends so as to permit the drainage of the condensable matter into the lower end of the scrubber casing which constitutes the tar trap. These vertical extensions also serve to conduct the incoming gas to the lower end of the scrubber casing and the outgoing gas from the top to the bottom of said casing, thereby permitting of the straight lateral external connections as described.

In detail, A is the scrubber casing, preferably of cylindrical form and provided at its upper end with the usual water inlet conduit B and sprinkling nozzle C.

D is a grating near the lower end of the casing, upon which is supported the coke or other scrubbing material E. Below the grate D is formed a gas space F and beneath this is a well G in which water is maintained at a constant level, as by means of the overflow connection H. I is a valve in this connection.

The gas inlet conduit J enters the casing A in the upper portion thereof and preferably passes directly in a straight line from the outlet orifice in the producer K, or its vaporizer, where the latter is separate. Inside the casing A, the conduit J has a downwardly-extending portion L which passes below the grate D and is in communication with the gas chamber. The gas outlet conduit is provided with a vertical portion M which extends from a gas space N at the upper end of the casing A downward through the grate D and has its lower end sealed in the water within the well G.

O is a laterally-extending portion connecting with the conduit M which passes outward through the casing A and preferably extends directly in a straight line to the lower end of the cleaner casing P. Thus, the casings K, A and P may be arranged in as close proximity to each other as desired and all of the tarry deposit in the gas connections is accumulated in the common well G at the lower end of the casing A.

With the above described construction, the gas from the producer passes through the conduit J and its extension L to the lower end of the casing A and then upward through the scrubbing material to the upper end of said casing. From this point, it again passes downward through the vertical conduit M and then outward through the lateral connection O to the cleaner. All of the tarry matter contained in the conduits will drain into the well G, from which it may be removed when necessary.

In addition to the valve-controlled water outlet connection H, an overflow connection H' is arranged at a higher level. Thus, when the valve I is closed, the water level within the casing will rise to that of the upper pipe, which will seal the lower end of the gas-inlet pipe L and cut off connection with the producer. This will be of value when the producer is not in operation in preventing leakage of gas from the system backward through the pipe L.

What I claim as my invention is:

1. In a gas apparatus, a purifier having gas chambers formed respectively at the lower and upper ends thereof, scrubbing material supported intermediate said chambers, a water spray, a gas inlet pipe, a gas outlet pipe, one of said pipes passing vertically through said scrubbing material in free communication respectively with one of said chambers, an extension on its opposite end passing laterally through the wall of the casing, and a straight detachable pipe coupling for connecting said pipe laterally with the adjacent apparatus.

2. A gas purifying apparatus comprising a casing, gas chambers in the lower and upper ends of said casing, and a liquid well below the lower gas chamber, scrubbing material supported within said casing intermediate said gas chambers, a water spray, a gas inlet pipe passing into the upper portion of said casing and extending vertically downward through the scrubbing material into free communication with the lower gas chamber, a gas outlet pipe passing into the lower portion of said casing and extending vertically upward through the scrubbing material into free communication with the upper gas chamber, and an open-ended downward extension of said gas outlet pipe projecting beneath the surface of liquid in the well, whereby a sealed drainage connection is formed for said pipe.

3. In a gas apparatus comprising a purifier, producer and scrubbing casings vertically arranged in close proximity to each other, gas chambers in the upper and lower ends of said purifier casing, scrubbing material supported intermediate said chambers, a water spray, a gas inlet pipe and a gas outlet pipe, said pipes passing vertically through said scrubbing material in free communication respectively with said lower and upper chambers, their opposite ends passing laterally through the walls of the casing, and straight detachable pipe couplings connecting said pipes laterally with the adjacent casings.

In testimony whereof I affix my signature in presence of two witnesses.

EUGENE HIGGINS.

Witnesses:
S. F. SEAGER,
JOHN BELL.